United States Patent
Nalepa

[19]

[11] Patent Number: 6,086,746
[45] Date of Patent: Jul. 11, 2000

[54] EFFICIENT INHIBITION OF BACTERIAL AND ALGICIDAL ACTIVITY IN AQUEOUS MEDIA

[75] Inventor: Christopher J. Nalepa, Baton Rouge, La.

[73] Assignee: Albemarle Corporation, Richmond, Va.

[21] Appl. No.: 09/049,186

[22] Filed: Mar. 27, 1998

[51] Int. Cl.[7] .................................................. C02F 1/461
[52] U.S. Cl. .......................... 205/500; 205/556; 205/701; 205/742; 204/242; 204/275
[58] Field of Search .................. 205/500, 556, 205/701, 742; 204/242, 275

[56] References Cited

U.S. PATENT DOCUMENTS

| | | | |
|---|---|---|---|
| 3,863,628 | 2/1975 | Vit | 128/66 |
| 5,039,383 | 8/1991 | Spotnitz et al. | 204/128 |
| 5,254,226 | 10/1993 | Williams et al. | 204/128 |
| 5,254,526 | 10/1993 | Hamilton . | |
| 5,264,136 | 11/1993 | Howarth et al. | 210/754 |
| 5,385,650 | 1/1995 | Howarth et al. | 204/103 |
| 5,422,126 | 6/1995 | Howarth et al. | 424/723 |
| 5,429,723 | 7/1995 | Atkinson | 204/556 |
| 5,476,670 | 12/1995 | Hight et al. | 424/661 |
| 5,527,547 | 6/1996 | Hight et al. | 424/661 |
| 5,641,520 | 6/1997 | Howarth et al. | 424/723 |

FOREIGN PATENT DOCUMENTS

| | | |
|---|---|---|
| 1358617 | 7/1974 | United Kingdom . |
| 8903809 | 5/1989 | WIPO . |
| 9630562 | 10/1996 | WIPO . |

OTHER PUBLICATIONS

Petrosyan, V. A., "Some Examples of Electrosynthesis Development Involving Halogen–derivatives", Russian Journal of Electrochemistry, vol. 32, No. 1, 1996 pp. 52–55, (no month).

Blackburn, Lois J. —"They did it on porpoise", *Pool & Spa News*, Dec. 7, 1987.

Williams, Rick—"Bromine Generators Offer An Alternative To Pool Chlorination", *Managers Report*, May 1995, pp. 12–15.

Howarth and Dadgar "Some Modern Applications of Bromide Ion Electrolysis", presented at the Fifth International Forum on Electrolysis at Fort Lauderdale, Florida, Nov. 10–14, 1991.

Petrosyan, V.A., "Some Example of Electrosynthesis Development Involving Halogen–derivatives", Russian Journal of Electrochemistry, 1996, Vol. 32, No. 1, ppg.47–58, no month).

*Primary Examiner*—Arun S. Phasge
*Attorney, Agent, or Firm*—E. E. Spielman, Jr.

[57] ABSTRACT

Operating efficiency of an electrobromination device providing disinfectant to an aqueous medium such as a swimming pool, spa, or water-cooled refrigeration unit is achieved by passing electric current across an undivided cell through which is flowing an aqueous medium containing bromide ions and a nitrogen-containing electrobromination-enhancing adjuvant such that bromide ions are electrolytically oxidized to bromine in the aqueous medium under conditions enabling formation in situ of hypobromous acid, dissociated hypobromous acid, or both.

34 Claims, 5 Drawing Sheets

EFFICIENT INHIBITION OF BACTERIAL AND ALGICIDAL ACTIVITY IN AQUEOUS MEDIA

BACKGROUND

Electrobromination devices for use in generating bromine disinfectant for aqueous systems such as swimming pools, are known. They function by electrolyzing aqueous sodium bromide or aqueous mixtures of sodium chloride and sodium bromide by passing electric current across an undivided cell. Typical deficiencies in such a system include:

1) Bromine generated in the cell is normally consumed rapidly;
2) Relatively large cells are necessary for adequate disinfection;
3) Power costs for operation of such systems are high;
4) Caustic alkali produced at the cathode requires neutralization with acid;
5) The units require highly conductive solutions, which in turn cause increased corrosion, especially of metal components exposed to the solutions;
6) The highly conductive solutions needed for operating the units have an undesirable salty taste; and
7) The electrodes tend to wear out prematurely, and need replacement.

It would be of inestimable value if an effective way could be found that would overcome or at least significantly reduce most, if not all, of the foregoing deficiencies. This invention is deemed to have achieved this important goal in a highly efficient and effective manner.

SUMMARY OF THE INVENTION

Pursuant to one of the embodiments of this invention, the operation of an electrobromination device is improved by passing the electric current across an undivided cell through which is flowing an aqueous medium containing bromide ions and a nitrogen-containing electrobromination-enhancing adjuvant such that bromide ions are electrolytically oxidized to bromine in the aqueous medium under conditions enabling formation in situ of hypobromous acid, dissociated hypobromous acid, or both, and whereby the efficiency of operation of the electrobromination device is increased.

In another embodiment, there is provided a method of inhibiting bacterial and algicidal activity in an aqueous medium, which method comprises generating hypobromous acid in an aqueous medium by operating an electrobromination device in an aqueous medium containing bromide ions and to which has been added a nitrogen-containing electrobromination-enhancing adjuvant such that bromide ions are electrolytically oxidized to bromine in the aqueous medium under conditions enabling formation in situ of hypobromous acid, dissociated hypobromous acid, or both, and whereby the operating efficiency of the electrobromination device is increased.

Additional Embodiments of this Invention Include:

a) A method of inhibiting bacterial and algicidal activity as described above further comprising causing the so-formed hypobromous acid, dissociated hypobromous acid, or both, and said adjuvant to be disseminated within the body of said medium in proportions such that the pH of said aqueous medium is maintained within the range of about 7.2 and about 9.4.

b) A method of inhibiting bacterial and algicidal activity as described above further comprising maintaining the molar ratio of chloride ion to bromide ion at no more than 1.14:1.

c) A method of inhibiting bacterial and algicidal activity as described above further comprising maintaining (a) the level of the alkalinity in the body of said aqueous medium within the range of about 50 and about 350 ppm (wt/wt); (b) the level of calcium hardness in the body of said aqueous medium within the range of about 40 and about 400 ppm (wt/wt); and the level of total dissolved solids in the body of said aqueous medium within the range of about 0.5 and about 5.0 grams per liter.

d) A method of inhibiting bacterial and algicidal activity as described above further comprising maintaining the molar ratio of chloride ion to bromide ion at no more than 0.58:1.

e) A method of inhibiting bacterial and algicidal activity as described above wherein the adjuvant added to said aqueous medium was an unhalogenated 5,5-dialkylhydantoin wherein each alkyl group contains, independently, 1 to 4 carbon atoms, or a solution of said dialkylhydantoin.

f) A method of inhibiting bacterial and algicidal activity as described above wherein the adjuvant added to said aqueous medium was 5,5-dimethylhydantoin or a solution thereof.

g) A method of inhibiting bacterial and algicidal activity as described above wherein the adjuvant added to said aqueous medium was succinimide, or a water solution thereof; succinimide substituted on one or both of the ring carbon atoms by an alkyl group containing 1 to 4 carbon atoms, or a water solution thereof; or a combination of any two or more of the foregoing.

h) A method of inhibiting bacterial and algicidal activity as described above wherein at least a portion of the body of said medium is periodically exposed to direct sunlight.

i) A method of inhibiting bacterial and algicidal activity as described above wherein the adjuvant added to said aqueous medium was 2-pyrrolidinone, or a water solution thereof; alkyl-substituted 2-pyrrolidinone wherein each alkyl group contains, independently, 1 to 4 carbon atoms, or a water solution thereof; or a combination of any two or more of the foregoing.

A further embodiment is apparatus which comprises (i) a body of an aqueous medium, and (ii) an electrobromination device which includes an undivided cell through which portions of said medium and electric current are flowing, said aqueous medium containing bromide ions and a nitrogen-containing electrobromination-enhancing adjuvant such that bromide ions are electrolytically oxidized to bromine in the aqueous medium under conditions enabling formation in situ of hypobromous acid, dissociated hypobromous acid, or both.

These and other embodiments and features of this invention will be still further apparent from the ensuing description, appended claims and accompanying figures.

FURTHER DETAILED DESCRIPTION

Figure 1:
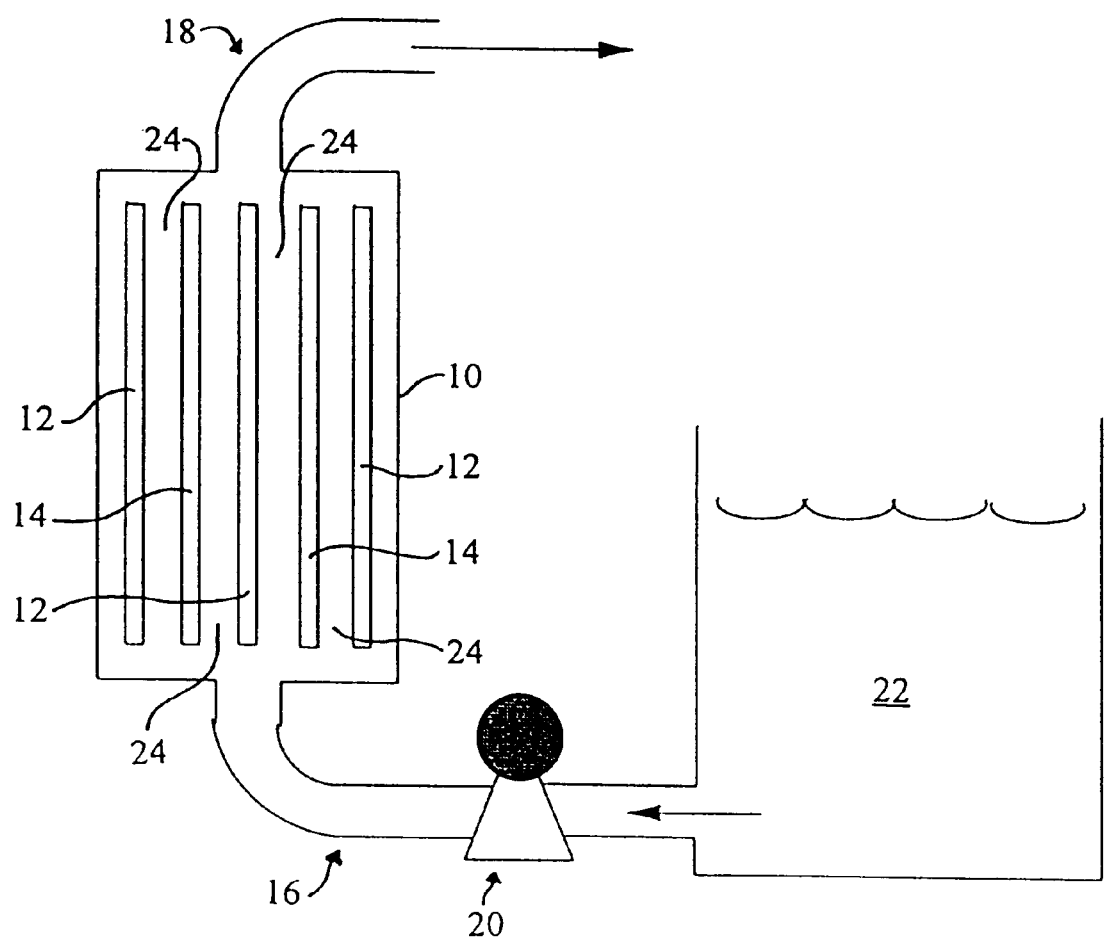
FIG. 1 is a schematic depiction of apparatus provided pursuant to one of the embodiments of this invention.

Various electrobromination devices can be used in the practice of this invention. In essence, and as schematically depicted in FIG. 1, the device typically will include a cell housing 10 encasing one or more spaced-apart anodes 12 and cathodes 14 that can be electrically energized by direct current, a water intake system 16 upstream from the electrodes, a water outlet system 18 downstream from the electrodes, and a pump, turbine or other mechanical unit 20 for causing aqueous medium to flow from the body of the aqueous medium 22 into the water intake system 16, through at least the space 24 between the electrodes, and thence through the water outlet system 18 and back into the body of the aqueous medium 22. Naturally, commercially-available electrobromination devices are typically equipped with a number of refinements, such as on-off power switches, adjustable power controls for regulating the amount of electrical current flowing across the electrodes, fuses or other automatic power intake cutoff switches to protect the system against electrical power surges, timing controls for turning the system on and off at preselected time intervals, and like safety and/or operational refinements. One preferred device is the Bromitron® bromine generator available from Adrem Manufacturing, Inc., Orlando, Fla. Various electrolytic generators are described, for example, in U.S. Pat. Nos. 4,142,959; 4,255,246; 4,256,552; 4,263,114; 4,306,952; 4,714,534; 4,917,782; 5,039,383; and 5,254,226.

Suitable nitrogen-containing electrobromination-enhancing adjuvants for use in this invention can be selected from among such compounds as one or a mixture of unhalogenated 5,5-dialkyl-hydantoins wherein each alkyl group contains, independently, 1 to 4 carbon atoms; succinimide, succinimide substituted on one or both of the ring carbon atoms by an alkyl group containing (independently when both ring carbons are alkyl-substituted), 1 to 4 carbon atoms, or a mixture of two or more such succinimides; 2-pyrrolidinone, alkyl-substituted 2-pyrrolidinones wherein each alkyl group contains, independently, 1 to 4 carbon atoms, or a mixture of two or more such 2-pyrrolidinones; cyanuric acid; or sulfamic acid. For some applications such as refrigeration water treatment, the dosage level of the adjuvant can be in the range of about 25 to about 1000 ppm (wt/wt), and thus the adjuvant selected should be soluble in the aqueous medium at least to the extent of the concentration selected for use therein. Preferably, the solubility of the adjuvant will be greater than such minimum solubility, but the adjuvant need not be soluble in all proportions in water. For application to swimming pool water or other recreational water systems (spas, etc.), the dosage level of the adjuvant is preferably in the range of about 25 to about 100 ppm (wt/wt). The adjuvant or mixture of adjuvants can be added directly to the aqueous medium without dilution, or it can be added in the form of a preformed solution, preferably in water, although since the dosage level is usually so small, the adjuvant may be added as preformed solution in a suitable organic solvent such as ethanol or a mixture of water and ethanol. Of the foregoing adjuvants, sulfamic acid, succinimide, 2-pyrrolidinone, and cyanuric acid are preferred adjuvants. The most preferred adjuvant is 5,5-dimethylhydantoin or a solution thereof.

In the practice of this invention the aqueous mixture comprising hypobromous acid, dissociated hypobromous acid, or both, and the adjuvant leaving the electrobromination device preferably is disseminated within the body of the aqueous medium in proportions such that the pH of the overall aqueous medium is maintained within the range of about 7.2 and about 9.4, and in the case of swimming pools and spas, within the range of about 7.2 and about 8.2.

The level of bromide in the body of the aqueous medium should be maintained within the range of about 50 and about 2000 ppm (wt/wt). Preferably, the bromide is derived by adding sodium bromide to the aqueous medium, although other bromide salts, such as LiBr, KBr, $CaBr_2$, and $MgBr_2$ may be used. Naturally for treating water to which persons or animals will or may be exposed (swimming pools, spas, etc.), the toxicological properties of the bromide salt should be taken into consideration.

Generally speaking, the level of the alkalinity in the body of the aqueous medium is typically maintained within the range of about 50 and about 350 ppm (wt/wt); the level of calcium hardness in the body of the aqueous medium is typically maintained within the range of about 40 and about 400 ppm (wt/wt); and the level of total dissolved solids in the body of the aqueous medium is typically maintained within the range of about 0.5 and about 5.0 grams per liter.

Total alkalinity is a measure of the buffering capacity of the water or, in other words, the ability of the water to resist a change in pH. For swimming pools and spas, it is preferred to maintain alkalinity in the range of about 80 and about 120 ppm. See in this connection, *Basic Spa & Pool Technology*, 2nd Ed., p. 290, National Spa & Pool Institute, Alexandria, Va., 1995. To maintain a specified total alkalinity, a substance such as sodium carbonate or sodium bicarbonate is periodically adding to the body of water. A suitable product is Leslie's "Alkalinity Up" (sodium bicarbonate, 100%, Leslie's Poolmart Chatsworth, Calif.).

A certain level of calcium hardness in water is necessary to prevent excessive corrosion or etching of plaster and other surfaces. However, too much calcium hardness can lead to scale formation and other problems. For swimming pool and spa usage, it is generally recommended to maintain calcium hardness levels in the range of 200 and 400 ppm (Basic Spa & Pool Technology, 2nd Ed., p. 324, National Spa & Pool Institute, Alexandria, Va., 1995). This is accomplished by adding calcium chloride (either as the hydrated or anhydrous salt). A suitable product is Leslie's Hardness Plus (calcium chloride anhydrous, 94–97%; water 3–6%, Leslie's Poolmart Chatsworth, Calif.).

This invention is especially effective in maintaining suitably high disinfectant levels in swimming pools, spas, or the like, with high efficiency operation of the electrobromination device, even in cases where the pool or spa is exposed to direct sunlight.

Among the surprising features of this invention is that the effectiveness of the adjuvant is not materially impaired by exposure to the electrolytic process taking place in the electrobromination device. The adjuvant survives the electrolytic action. Indeed, the adjuvant and the electrobromination device mutually cooperate to provide a plurality of advantageous beneficial results such as maintenance of highly effective levels of disinfectant in the aqueous medium while at the same time achieving greatly enhanced efficiency of operation of the electrobromination device. Some of these highly advantageous results are demonstrated in the following illustrative examples.

EXAMPLE 1

In order to demonstrate some of the advantages made possible by the practice of this invention, two test programs were carried out in an outdoor swimming pool in Baton Rouge, La. In both tests the weather was clear and sunny. The pool conditions during these tests were as follows: pH=7.6–7.8; alkalinity: 80–90 ppm; bromide 800 ppm; chloride=800 ppm; Ca hardness=130 ppm; total dissolved solids=2.0 g/L.

In both tests the pool was equipped with a Bromitron® bromine generator which generates hypobromous acid from bromide ion via electrolysis, and the Bromitron unit was set to turn on for twelve hours per day—i.e., from 10 AM to 4 PM and from 10 PM to 4 AM.

The first test program was a three-day test with the power setting of the Bromitron unit at maximum power (90% setting). On Day 1 of this test, the electrobrominator was run in the normal manner (i.e., without any adjuvant of this invention). On Day 2 at 10:15 AM, 5,5-dimethylhydantoin (DMH) (2.5 lbs.) was introduced into the pool. This was sufficient to provide a level of 25 ppm of adjuvant. The test was then continued during Days 2 and 3, except that the Bromitron unit was not operated from 10 PM to 4 AM during the night of Day 2, and thus only operated for 6 hours during Day 2. Surprisingly, the data (set forth in Table 1) show that DMH significantly improved the efficiency of the electrobromination process not only during Day 2, but during Day 3 as well. This improvement in efficiency was so substantial that the device could be turned off during its overnight cycle on Day 2 —thereby saving power, prolonging electrode life, decreasing by-product formation, minimizing acid addition—and still maintain a significant residual disinfectant level in the morning. Without DMH, even the overnight operation of the electrobrominator yielded but a fraction of the morning residual disinfectant level (see data for morning of Day 2).

TABLE 1

| Day of Test | Time and Amount of Bromine in the Pool Water, ppm |
| --- | --- |
| Day 1 | 10 AM, 0.70; 11 AM, 0.74; 12 Noon, 0.65; 1 PM, 0.61; 2 PM, 0.56; 3 PM 0.61; 4 PM, 0.70 |
| Day 2 | 10 AM ,0.74; 11 AM, 1.31; 12 Noon, 1.62; 1 PM, 2.09; 2 PM, 2.39; 3 PM, 2.66; 4 PM, 2.88 |
| Day 3 | 10 AM, 2.07; 11 AM, 2.48; 12 Noon, 2.70; 1 PM, 3.02; 2 PM, 3.15; 3 PM, 3.40; 4 PM, 3.62 |

Figure 2:
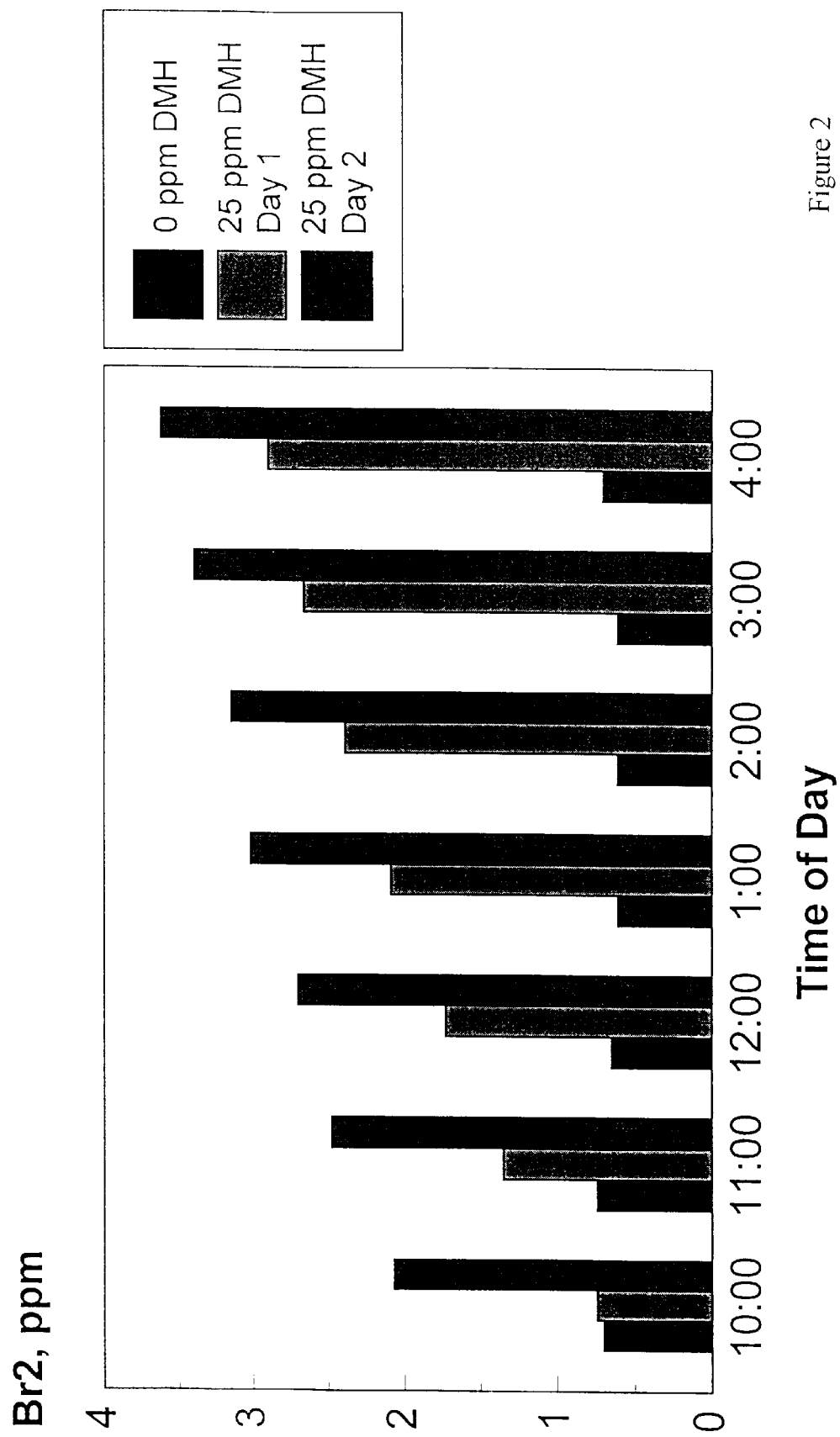
FIG. 2 is a bar chart summarizing the results of a test program conducted in an outdoor swimming pool in Baton Rouge, La., and illustrating the improved efficiency of an electrobromination process when conducted pursuant to this invention.

The daytime results of this test program are depicted in FIG. 2.

Figure 3:
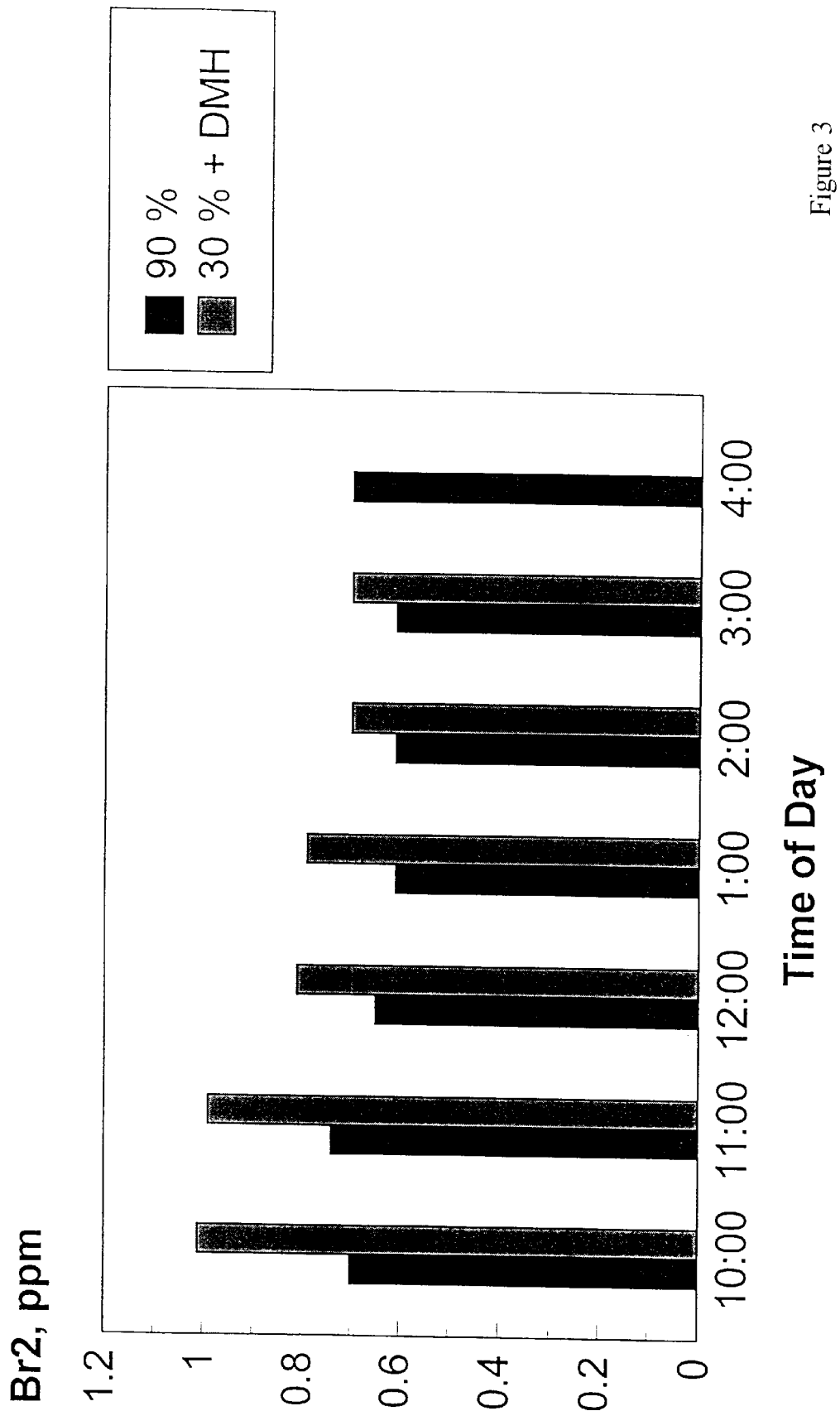
FIG. 3 is a bar chart summarizing the results of another test program conducted in an outdoor pool in Baton Rouge, La., and illustrating the highly satisfactory disinfectant levels that can be achieved pursuant to this invention even when operating an electrobromination unit at a greatly reduced power setting.

The second test program employed the DMH-treated pool water from the first test program, but with the power setting of the electrobromination unit decreased to the 30% setting. Analysis indicated that the level of DMH in the pool water was 20 ppm. The results were compared to operation of the pool on an earlier day where a 90% power setting was used but without use of an adjuvant of this invention. The data, tabulated in Table 2 and plotted in FIG. 3, indicate that the disinfectant level achieved during the day at this reduced power setting with the DMH adjuvant was at least equivalent to that achieved at 90% power level without the adjuvant. This again demonstrates benefits such as saving power, prolonging electrode life, decreasing by-product formation, and minimizing acid addition achievable with use of an adjuvant together with the electrobromination process pursuant to this invention.

TABLE 2

| Time of Day | Pool Water Disinfectant Level, ppm $Br_2$ |
| --- | --- |
| 10 AM | 1.01 with DMH; 0.70 without DMH |
| 11 AM | 0.99 with DMH; 0.74 without DMH |
| 12 Noon | 0.81 with DMH; 0.65 without DMH |
| 1 PM | 0.79 with DMH; 0.61 without DMH |
| 2 PM | 0.70 with DMH; 0.56 without DMH |
| 3 PM | 0.70 with DMH; 0.61 without DMH |
| 4 PM | Not Determined with DMH; 0.70 without DMH |

It can be seen from the results achieved in Example 1 that a number of advantages accrue from the practice of this invention, including:

1) The ability to maintain consistent, high residual amounts of disinfectant for improved biocontrol;
2) The flexibility to lower the bromide loading of the water system to reduce corrosiveness to lower chemical costs, and to increase bather comfort (less salty taste);
3) The opportunity to run the unit less frequently or to run it at lower power for economy, and to prolong electrode life;
4) The opportunity to use a smaller, less expensive electrobromination unit to lower capital costs; and
5) The opportunity to reduce maintenance and lower hazards associated with handling corrosive acids—i.e., since sodium hydroxide is a co-generated during electrobromination and since this raises the pH of the pool with time, less acid addition is required to maintain the pool between the normal operating limits of pH (typically ca. 7.2–8.2).

EXAMPLE 2

Figure 4:
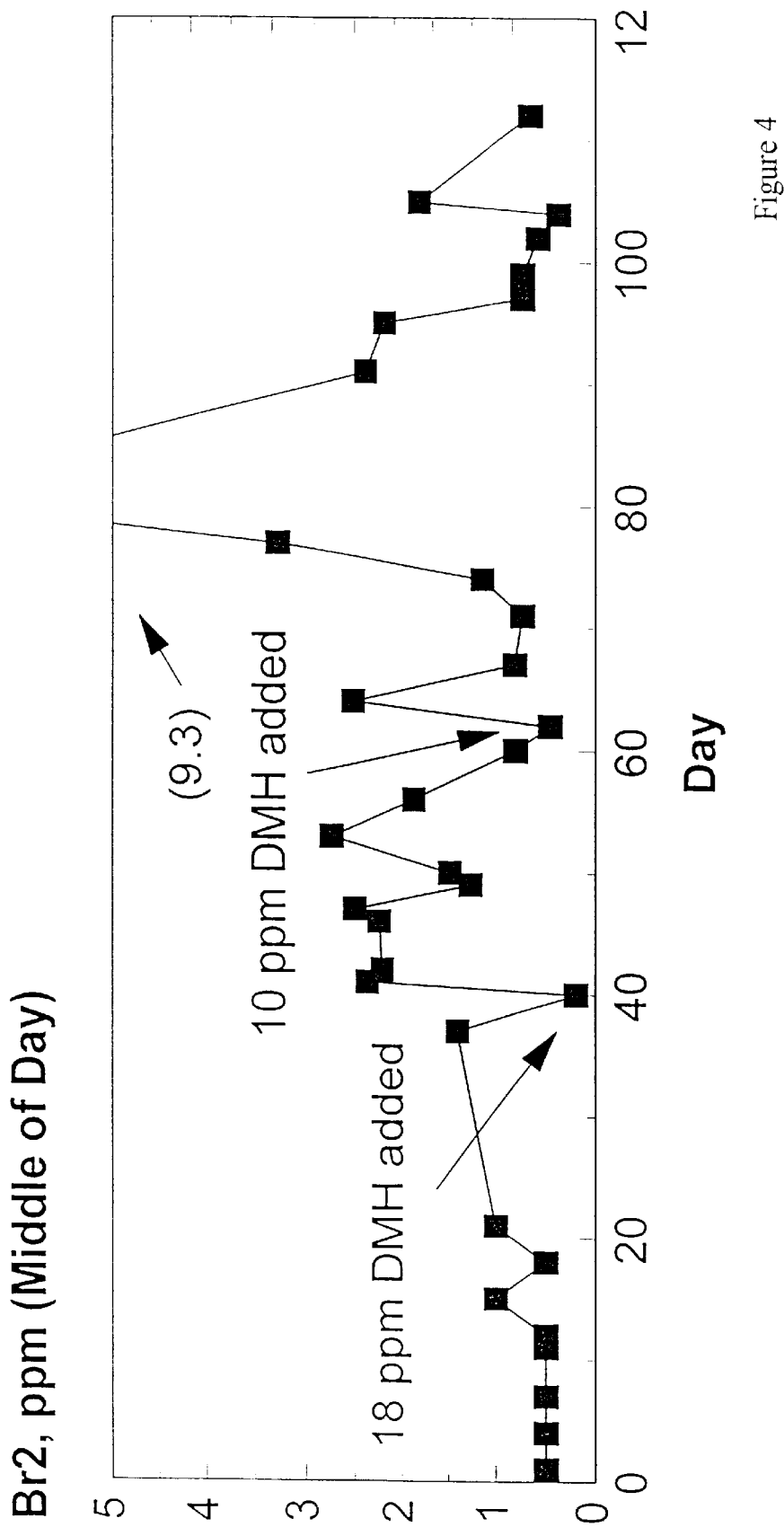
FIG. 4 is a plot of data obtained in an extended test program in an outdoor swimming pool in Orlando, Fla., and further illustrating the highly satisfactory disinfectant levels that can be achieved pursuant to this invention.

An extended field test was performed in an outdoor in-ground pool located in Orlando, Fla. The pool had an approximate capacity of 16,000 gallons and was exposed to sunlight for most of the day. Bromine disinfectant levels were monitored for 40 days without adjuvant then monitored for an additional 70 days with added adjuvant (DMH, 5,5-dimethylhydantoin). The electrobromination unit was operated at 50% power for period of 18 hours (7 AM to 1 AM daily) throughout the test and the pool chemistry averaged as follows: pH=8.0; alkalinity=100; calcium hardness=260; bromide=1520 ppm; chloride=390 ppm; total dissolved solids=1.8 g/L. The results of this extended test are plotted in FIG. 4.

Bromine disinfectant levels averaged 0.7 ppm during the first 39 days of the test using the DPD calorimetric method and visual comparison with a color comparator. Such tests kits are available from numerous sources such as Leslie's Swimming Pool Supplies (Chatsworth, Calif.), Taylor Technologies, Inc. (Sparks, Md.), Hach Company (Loveland, Colo.), LaMotte Company (Chestertown, Md.), Palintest USA (Erlanger, Ky.), etc. On day 40, a portable spectrophotometer (Hach Company Model 800) indicated a bromine disinfectant level of 0.2 ppm. This unit was used for the remaining duration of the field test since it provided a more accurate indication of bromine disinfectant level than the visual method.

On day 40, the pool was charged with 1.5 kilograms of DMH (5,5-dimethylhydantoin) adjuvant. This provided a DMH level in the pool of 18 ppm. The addition of DMH provided an immediate increase in the bromine disinfectant level in the pool on subsequent days (see FIG. 4). An additional amount of DMH adjuvant (1 kg.) was added on Day 60. During the 71 days of data collection with DMH adjuvant, bromine disinfectant levels averaged 2.0 ppm.

The results from this extended test demonstrate the ability of an added adjuvant to improve the efficiency of the electrobromination process by providing increased bromine disinfectant levels.

EXAMPLE 3

Figure 5:
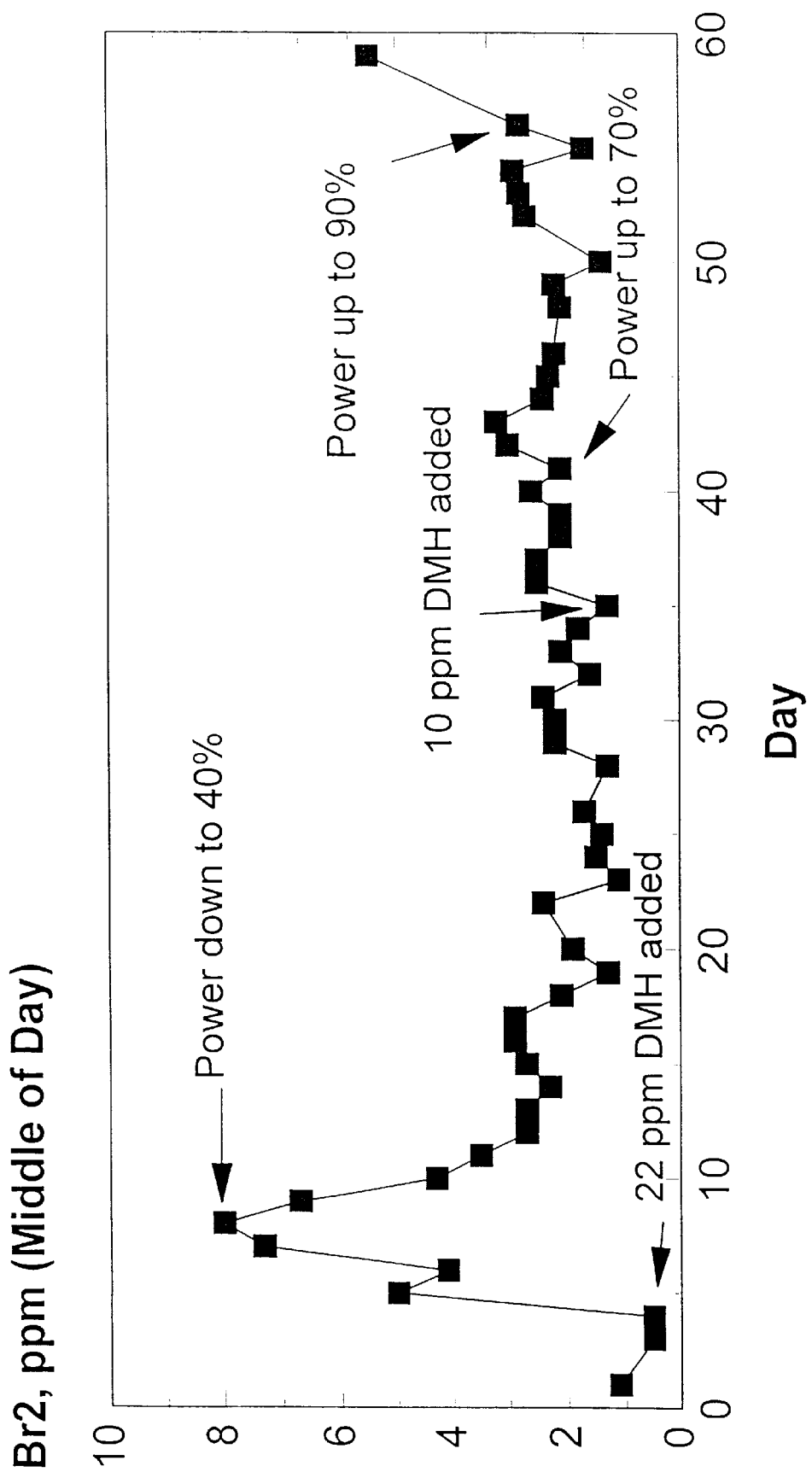
FIG. 5 is a plot of data obtained in an extended test program in an outdoor swimming pool in Clearwater, Fla., and illustrating the highly satisfactory disinfectant levels that can be achieved pursuant to this invention even when operating an electrobromination unit at a greatly reduced power setting.

Another extended field test was performed in an outdoor in-ground pool located in Clearwater, Fla. The pool had an approximate capacity of 10,000 gallons and was partially protected from direct sunlight by a screen. Bromine disinfectant levels were monitored for 4 days without adjuvant then monitored for an additional 55 days with added adjuvant (DMH, 5,5-dimethylhydantoin). The electrobromination unit was initially operated at 70% power for a period of 14 hours (9 AM to 11 PM daily) and the pool chemistry averaged as follows: pH=8.2; alkalinity =120; calcium hardness=340; bromide=840 ppm; chloride=440 ppm; total dissolved solids=1.6 g/L. The results of this extended test are plotted in FIG. 5.

Bromine disinfectant levels averaged 0.8 ppm during the first 4 days of the study using the DPD colorimetric test and a portable spectrophotometer (Hach Model 800). On day 4, the pool was charged with 2 pounds of DMH (5,5-dimethylhydantoin) adjuvant. This provided a DMH level in the pool of 22 ppm. The addition of DMH provided an immediate increase in the bromine disinfectant level in the pool for the next several days (see FIG. 5) to the point where the power setting of the electrobromination unit was decreased to 40% from day 8 to 28 since this provided acceptable disinfectant levels. An additional amount of DMH adjuvant (1 lb.) was added on Day 24. During the 59 days of data collection with DMH adjuvant, bromine disinfectant levels averaged 2.9 ppm.

The results from this extended test demonstrate the ability of an added adjuvant to improve the efficiency of the electrobromination process by providing increased bromine disinfectant levels and by enabling the unit to be run at a reduced power setting.

It is to be understood that the components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, transformations and/or reactions, if any, take place in the resulting mixture or solution as such changes, transformations and/or reactions are the natural result of bringing the specified components together under the conditions called for pursuant to this disclosure. Thus the reactants and components are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises," "is," etc.), the reference is to the substance, component or ingredient as it existed at the time just before it was first contacted, blended or mixed with one or more other substances, components and/or ingredients in accordance with the present disclosure. Thus, the fact that a substance, component or ingredient may have lost its original identity through a chemical reaction or transformation during the course of contacting, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

Each and every patent or publication referred to in any portion of this specification is incorporated in toto into this disclosure by reference, as if fully set forth herein.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A method of increasing the operating efficiency of an electrobromination device providing disinfectant to an aqueous medium, which method comprises passing electric current across an undivided cell through which is flowing an aqueous medium containing from about 800 to about 2000 ppm (wt/wt) of bromide ions and a nitrogen-containing electrobromination-enhancing adjuvant such that bromide ions are electrolytically oxidized to bromine in the aqueous medium under conditions enabling formation in situ of hypobromous acid, dissociated hypobromous acid, or both, said aqueous medium containing no more than 800 ppm (wt/wt) of chloride ion such that the molar ratio of chloride ion to bromide ion is no more than 2.3:1. whereby the operating efficiency of the electrobromination device is increased.

2. A method according to claim 1 further comprising causing the so-formed hypobromous acid, dissociated hypobromous acid, or both, and said adjuvant to be disseminated within the body of said medium in proportions such that the pH of said aqueous medium is maintained within the range of about 7.2 and about 9.4.

3. A method according to claim 2 further comprising maintaining (a) the level of the alkalinity in the body of said aqueous medium within the range of about 50 and about 350 ppm (wt/wt); (b) the level of calcium hardness in the body of said aqueous medium within the range of about 40 and about 400 ppm (wt/wt); and the level of total dissolved solids in the body of said aqueous medium within the range of about 0.5 and about 5.0 grams per liter.

4. A method according to claim 1 further comprising maintaining said molar ratio of chloride ion to bromide ion at no more than 1.14:1.

5. A method according to claim 1 further comprising maintaining (a) the level of the alkalinity in the body of said aqueous medium within the range of about 50 and about 350 ppm (wt/wt); (b) the level of calcium hardness in the body of said aqueous medium within the range of about 40 and about 400 ppm (wt/wt); and the level of total dissolved solids in the body of said aqueous medium within the range of about 0.5 and about 5.0 grams per liter.

6. A method according to claim 1 further comprising maintaining said molar ratio of chloride ion to bromide ion at no more than 0.58:1.

7. A method according to claim 1 wherein the adjuvant added to said aqueous medium was an unhalogenated 5,5-dialkylhydantoin wherein each alkyl group contains, independently, 1 to 4 carbon atoms, or a solution of said dialkylhydantoin.

8. A method according to claim 1 wherein the adjuvant added to said aqueous medium was 5,5-dimethylhydantoin or a solution thereof.

9. A method according to claim 1 wherein the adjuvant added to said aqueous medium was succinimide, or a water solution thereof; succinimide substituted on one or both of the ring carbon atoms by an alkyl group containing 1 to 4 carbon atoms, or a mixture of two or more such succinimides, or a water solution thereof; or a combination of any two or more of the foregoing.

10. A method according to claim 1 wherein at least a portion of the body of said medium is periodically exposed to direct sunlight.

11. A method according to claim 10 further comprising causing the so-formed hypobromous acid, dissociated hypobromous acid, or both, and said adjuvant to be disseminated within the body of said medium in proportions such that the pH of said aqueous medium is maintained within the range of about 7.2 and about 9.4.

12. A method according to claim 11 further comprising maintaining (a) the level of the alkalinity in the body of said aqueous medium within the range of about 50 and about 350 ppm (wt/wt); (b) the level of calcium hardness in the body of said aqueous medium within the range of about 40 and about 400 ppm (wt/wt); and the level of total dissolved solids in the body of said aqueous medium within the range of about 0.5 and about 5.0 grams per liter.

13. A method according to claim 10 further comprising maintaining (a) the level of the alkalinity in the body of said aqueous medium within the range of about 50 and about 350 ppm (wt/wt); (b) the level of calcium hardness in the body of said aqueous medium within the range of about 40 and about 400 ppm (wt/wt); and the level of total dissolved solids in the body of said aqueous medium within the range of about 0.5 and about 5.0 grams per liter.

14. A method according to claim 10 wherein the adjuvant added to said aqueous medium was an unhalogenated 5,5-dialkylhydantoin wherein each alkyl group contains, independently, 1 to 4 carbon atoms, or a solution of said dialkylhydantoin.

15. A method according to claim 10 wherein the adjuvant added to said aqueous medium was 5,5-dimethylhydantoin, or a solution thereof.

16. A method according to claim 15 further comprising causing the so-formed hypobromous acid, dissociated hypobromous acid, or both, and said adjuvant to be disseminated within the body of said medium in proportions such that the pH of said aqueous medium is maintained within the range of about 7.2 and about 9.4.

17. A method according to claim 1 wherein the adjuvant added to said aqueous medium was 2-pyrrolidinone, or a water solution thereof; alkyl-substituted 2-pyrrolidinone wherein each alkyl group contains, independently, 1 to 4 carbon atoms, or a mixture of two or more such 2-pyrrolidinones, or a water solution thereof; or a combination of any two or more of the foregoing.

18. A method of inhibiting bacterial and algicidal activity in an aqueous medium, which method comprises generating hypobromous acid in an aqueous medium by operating an electrobromination device in an aqueous medium containing from about 800 to about 2000 ppm (wt/wt) of bromide ions and to which has been added a nitrogen-containing electrobromination-enhancing adjuvant such that bromide ions are electrolytically oxidized to bromine in the aqueous medium under conditions enabling formation in situ of hypobromous acid, dissociated hypobromous acid, or both, said aqueous medium containing no more than 800 ppm (wt/wt) of chloride ion such that the molar ratio of chloride ion to bromide ion is no more than 2.3:1, whereby the operating efficiency of the electrobromination device is increased.

19. Apparatus which comprises (i) a body of an aqueous medium, and (ii) an electrobromination device which includes an undivided cell through which portions of said medium and electric current are flowing, said aqueous medium containing from about 800 to about 2000 ppm (wt/wt) of bromide ions and a nitrogen-containing electrobromination-enhancing adjuvant such that bromide ions are electrolytically oxidized to bromine in the aqueous medium under conditions enabling formation in situ of hypobromous acid, dissociated hypobromous acid, or both, said aqueous medium containing no more than 800 ppm (wt/wt) of chloride ion such that the molar ratio of chloride ion to bromide ion is no more than 2.3:1.

20. Apparatus of claim 19 wherein the output of hypobromous acid, dissociated hypobromous acid, or both, from said device is in proportions such that the pH of said aqueous medium is maintained within the range of about 7.2 and about 9.4.

21. Apparatus of claim 19 wherein said molar ratio of chloride ion to bromide ion is no more than 1.14:1.

22. Apparatus of claim 19 wherein the adjuvant added to said aqueous medium was an unhalogenated 5,5-dialkylhydantoin wherein each alkyl group contains, independently, 1 to 4 carbon atoms, or a solution of said dialkylhydantoin.

23. Apparatus of claim 19 wherein the adjuvant added to said aqueous medium was 5,5-dimethylhydantoin or a solution thereof.

24. Apparatus of claim 19 wherein the adjuvant added to said aqueous medium was (a) succinimide, or a water solution thereof; succinimide substituted on one or both of the ring carbon atoms by an alkyl group containing 1 to 4 carbon atoms, or a mixture of two or more such succinimides, or a water solution thereof; or a combination of any two or more of the foregoing; or (b) 2-pyrrolidinone, or a water solution thereof; alkyl-substituted 2-pyrrolidinone wherein each alkyl group contains, independently, 1 to 4 carbon atoms, or a mixture of two or more such 2-pyrrolidinones, or a water solution thereof; or a combination of any two or more of the foregoing.

25. Apparatus of claim 19 wherein the body of said aqueous medium has (a) a level of the alkalinity within the range of about 50 and about 350 ppm (wt/wt); (b) a level of calcium hardness within the range of about 40 and about 400 ppm (wt/wt); and (c) a level of total dissolved solids within the range of about 0.5 and about 5.0 grams per liter; and wherein the output of hypobromous acid, dissociated hypobromous acid, or both, from said device is in proportions such that the pH of said aqueous medium is maintained within the range of about 7.2 and about 9.4.

26. Apparatus of claim 17 wherein said molar ratio of chloride ion to bromide ion is no more than 0.58:1.

27. A method of operating an electrobromination device which comprises:
 a) passing electric current across an undivided cell through which is flowing an aqueous medium from a body of aqueous medium containing from about 800 to about 2000 ppm (wt/wt) of bromide ions and a nitrogen-containing electrobromination-enhancing adjuvant such that bromide ions are electrolytically oxidized to bromine in the aqueous medium under conditions enabling formation in situ of hypobromous acid, dissociated hypobromous acid, or both, said aqueous medium containing no more than 800 ppm (wt/wt) of chloride ion such that the molar ratio of chloride ion to bromide ion is no more than 2.3:1, wherein (1) the level of the alkalinity in the body of said aqueous medium is within the range of about 80 and about 120 ppm (wt/wt), (2) the level of calcium hardness in the body of said aqueous medium is within the range of about 200 and about 400 ppm (wt/wt), and (3) the level of total dissolved solids in the body of said aqueous medium is within the range of about 0.5 and about 5.0 grams per liter; and b) disseminating within the body of said medium, so-formed hypobromous acid, dissociated hypobromous acid, or both, in proportions such that the pH of the body of said aqueous medium is maintained within the range of about 7.2 and about 8.2;

whereby the operating efficiency of the electrobromination device is increased.

28. A method according to claim 27 wherein the adjuvant added to the body of said aqueous medium was (a) succinimide, or a water solution thereof; succinimide substituted on one or both of the ring carbon atoms by an alkyl group containing 1 to 4 carbon atoms, or a mixture of two or more such succinimides, or a water solution thereof; or a combination of any two or more of the foregoing; or (b) 2-pyrrolidinone, or a water solution thereof; alkyl-substituted 2-pyrrolidinone wherein each alkyl group contains, independently, 1 to 4 carbon atoms, or a mixture of two or more such 2-pyrrolidinones, or a water solution thereof; or a combination of any two or more of the foregoing.

29. A method according to claim 27 wherein at least a portion of the body of said medium is periodically exposed to direct sunlight.

30. A method according to claim 27 wherein the adjuvant added to the body of said aqueous medium was an unhalogenated 5,5-dialkylhydantoin wherein each alkyl group contains, independently, 1 to 4 carbon atoms, or a solution of said dialkylhydantoin.

31. A method according to claim 27 wherein the adjuvant added to the body of said aqueous medium was 5,5-dimethylhydantoin or a solution thereof.

32. A method according to claim 31 wherein at least a portion of the body of said medium is periodically exposed to direct sunlight.

33. A method of claim 27 further comprising maintaining said molar ratio of chloride ion to bromide ion at no more than 1.14:1.

34. A method of claim 27 further comprising maintaining said molar ratio of chloride ion to bromide ion at no more than 0.58:1.

* * * * *

UNITED STATES PATENT AND TRADEMARK OFFICE
CERTIFICATE OF CORRECTION

PATENT NO. : 6,086,746
DATED : July 11, 2000
INVENTOR(S) : Christopher J. Nalepa It is certified that error appears in the above-identified patent and that said Letters Patent is hereby corrected as shown below:

Column 10,
Line 57, reads "... claim 17 ..." and should read -- ... claim 19 ... --.

Signed and Sealed this

Twentieth Day of November, 2001

Attest:

NICHOLAS P. GODICI
Attesting Officer      Acting Director of the United States Patent and Trademark Office

Disclaimer 6,086,746—Christopher J. Nalepa, Baton Rouge, La. EFFICIENT INHIBITION OF BACTERIAL AND ALGICIDAL ACTIVITY IN AQUEOUS MEDIA. Patent dated July 11, 2000. Disclaimer filed June 3, 2002, by the assignee, Albemarle Corporation.

Hereby enters this disclaimer to claims 1-34 of said patent.

*(Official Gazette, September 10, 2002)*